US010733294B2

(12) United States Patent
Chen (10) Patent No.: US 10,733,294 B2
(45) Date of Patent: Aug. 4, 2020

(54) ADVERSARIAL ATTACK PREVENTION AND MALWARE DETECTION SYSTEM

(71) Applicant: Intel Corporation, Santa Clara, CA (US)

(72) Inventor: Li Chen, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 199 days.

(21) Appl. No.: 15/700,489

(22) Filed: Sep. 11, 2017

(65) Prior Publication Data

US 2019/0080089 A1 Mar. 14, 2019

(51) Int. Cl.
*G06F 21/56* (2013.01)
*G06N 20/00* (2019.01)
*G06N 7/00* (2006.01)

(52) U.S. Cl.
CPC .......... *G06F 21/563* (2013.01); *G06F 21/564* (2013.01); *G06F 21/566* (2013.01); *G06N 20/00* (2019.01); *G06N 7/005* (2013.01)

(58) Field of Classification Search
CPC .... G06F 21/563; G06F 21/564; G06F 21/566; G06N 20/00; G06N 7/005; G06N 20/10
See application file for complete search history.

(56) References Cited

U.S. PATENT DOCUMENTS

| 2014/0037199 A1* | 2/2014 | Aharon .................. H04N 19/97 382/159 |
| 2017/0104657 A1* | 4/2017 | Gopalakrishnan ........................... H04L 41/0631 |
| 2017/0316342 A1* | 11/2017 | Franc ...................... G06F 17/11 |
| 2018/0357559 A1* | 12/2018 | Truong .................. G06N 20/00 |

OTHER PUBLICATIONS

Zubair et al—Dictionary learning based sparse coefficients for audio classification with max and average pooling, DigitalSignal Processing 23 (2013) 960-970 (Year: 2013).*

* cited by examiner

*Primary Examiner* — Meng Li
(74) *Attorney, Agent, or Firm* — Schwegman Lundberg & Woessner, P.A.

(57) ABSTRACT

Systems and methods may be used to classify incoming testing data, such as binaries, function calls, an application package, or the like, to determine whether the testing data is contaminated using an adversarial attack or benign while training a machine learning system to detect malware. A method may include using a sparse coding technique or a semi-supervised learning technique to classify the testing data. Training data may be used to represent the testing data using the sparse coding technique or to train the supervised portion of the semi-supervised learning technique.

24 Claims, 8 Drawing Sheets

ADVERSARIAL ATTACK PREVENTION AND MALWARE DETECTION SYSTEM

BACKGROUND

Malware attacks on systems throughout the world are prevalent and dangerous. Extortion, theft, and blackmail plague users of infected systems. As malware attacks become more sophisticated, increasingly complex techniques are being used to thwart the attackers. Machine learning techniques are one way to train systems to prevent malware attacks. Automated machine learning techniques have demonstrated powerfulness in malware detection. However, adversary malware attackers often attempt to attack machine learning systems using evasion attacks, tricking the machine learning systems to produce incorrect models. This results in a degraded classification accuracy or high false positives, affecting the effectiveness of the machine learning systems.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Systems and methods for preventing malware evasion attacks on a system are described herein. The systems and methods described herein are used to allow machine learning systems used to detect malware to not be corrupted by evasion attacks. Machine learning systems may be trained to prevent malware attacks. However, in adversarial machine learning, subtle attacks on the machine learning system, such as when it is training, may cause the machine learning system to accept certain malware attacks as normal, non-threatening requests. For example, one type of attack involves corrupting training malware samples (e.g., adding/deleting or changing features of files), resulting in low detection accuracy or high false positive rates.

An attacker may probe a machine learning system to attempt to determine what algorithm the machine learning system is running, what parameters are set in a machine learning system, or what actions may be permitted or rejected by the machine learning system. The attacker may find boundary decisions for the machine learning system in order to fit within the boundary to allow malware to pass through the machine learning system. The attack may be gradual with a slow change. The goal of the attacker is to trick the machine learning system into deciding that malware sent is actually benign.

The systems and methods described herein are used to efficiently detect malware while possessing resiliency to adversarial attacks, which may alter training data or testing data and mislead a malware detection system to produce degraded classification accuracy or higher false positive rates. A technique may include a machine learning systems, such as a semi-supervised learning system or a sparse representation system. The semi-supervised learning system uses labeled data (e.g., training data) and unlabeled data (e.g., testing data) to construct a Gaussian mixture modeling of the data. The semi-supervised learning system has robust classification performance even when the incoming testing data has a distribution that differs from (e.g., is not identical to) a distribution of the training data. The sparse representation system uses a representation of test data as a sparse combination of training data (e.g., binary samples), and uses recovered coefficients to classify the testing data. The sparse representation system also achieves robustness performance. When an attacker tries to perturb the training data or testing data, resulting in missing features or changed feature values, the sparse representation system may prevent such adversarial attacks.

Figure 1:
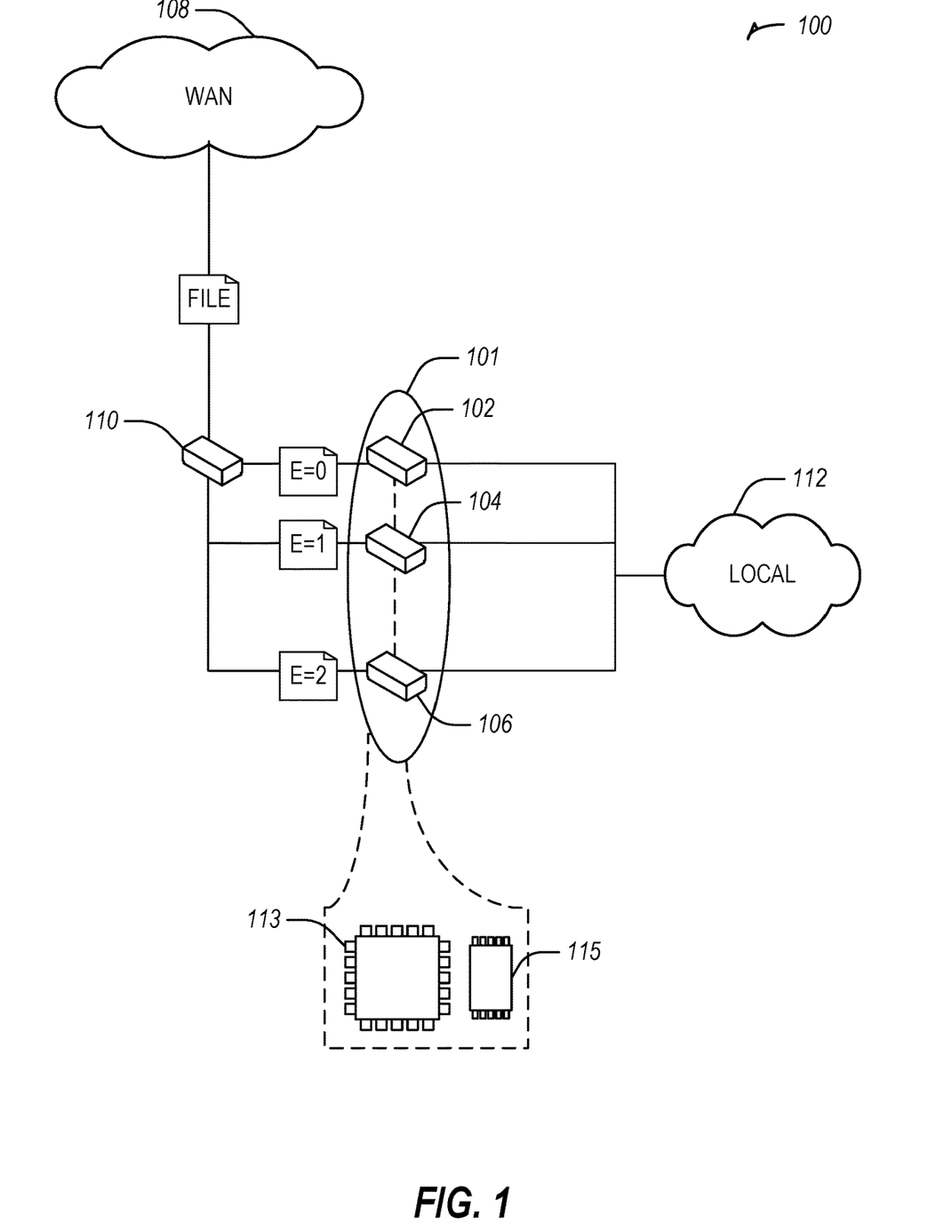
FIG. 1 illustrates a malware detection system to prevent evasion attacks in accordance with some embodiments.

FIG. 1 illustrates a malware detection system 100 to prevent evasion attacks in accordance with some embodiments. The malware detection system 100 includes a machine learning system 101 for malware detection. The machine learning system 101 may include one or more of three subsystems for adversarial attack detection. The systems for adversarial attack detection include a first subsystem 102 without adversarial attack detection beyond the basic abilities to detect malware of the machine learning system 101. The first subsystem 102 may include a default system or may be a state of the machine learning system 101 when a second or third system are turned off. The systems for adversarial attack detection may include a second subsystem 104 and a third subsystem 106.

The machine learning system 101 for malware detection includes a processor 113 and memory 114. The malware detection system and alert system 100 uses the machine learning system 101 to detect malware from a wide area network (WAN) 108 (e.g., a network, the internet, etc.) incoming to a local network 112 or a machine connected to the local area network 112. A router 110 may transmit incoming data (e.g., a binary file or system call) to the machine learning system 101.

A call function or other incoming binary file, represented in FIG. 1 at different times as FILE and then along paths according to a value of E (e.g., a value E may be a 1-bit identifier which may be set to select the learning system), depending on whether E=0, 1, or 2. The call function or incoming binary file may be sent from a remote address, router, or device via the WAN 108. The call function is first received by the router 110, and may be transmitted to the machine learning system 101. When E=0, the first subsystem 102 is used. The first subsystem 102 may be vulnerable to adversarial attacks. When incoming data is full trained, the first subsystem 102 may be used, such as when the training data includes data that has been checked for an adversarial attack contamination.

When E=1, the second subsystem 104 may be used. The second subsystem 104 is a resilient supervised learning system using sparse coding. The second subsystem 104 uses sparse coding to determine coefficients to a model based on training data to use as parameters for classifying testing data. In an example, training data is labeled data (e.g., a predetermination is made as to whether the data includes malware or is benign) and testing data is unlabeled data (e.g., there is no predetermination made as to whether the data includes malware or is benign). In an example, the second subsystem 104 may be selected when it is suspected that an attacker has changed features of the testing data. Features of the testing data may be changed by, for example, adding a feature or removing a feature to contaminate the data. In an example, the second subsystem 104 may be used when an attacker is, or is suspected of having, directly manipulating features (e.g., values) of the incoming binaries or call functions.

The second subsystem 104 classifies test data by representing the test data as a sparse combination of training data. The second subsystem 104 may detect a set of most relevant or most uncontaminated training data for the machine learning system 101 to use to train to detect malware. This process may be done manually or with predetermined information (e.g., metadata). By using sparse representation, the second subsystem 104 avoids unnecessary or costly computations that may be required for fully representing the test data using a combination of training data. By using fewer coefficients in the second subsystem 104, tracking may be more efficient and more effective.

The third subsystem 106 is a resilient model-based semi-supervised learning system. Semi-supervised learning addresses the potential issue of contamination of training data by using both labeled and unlabeled data. When E=2, the third subsystem 106 may be activated. The third subsystem 106 may be used to prevent adversarial attacks when a few samples are labeled (e.g., an insufficient amount to use the second subsystem 104). When a large portion of the data is unlabeled, the third subsystem 106 may be used to perform semi-supervised machine learning by using the labeled and the unlabeled data. In another example, the third subsystem 106 may be activated when the machine learning system 101 is suspected of being under attack by detecting that incoming data is distributed differently than the training data. This process may be done manually or using metadata about the incoming data (e.g., a source). The differing distribution may detected by comparing a distribution of the labeled data against a distribution of incoming data. The third subsystem 106 may use a model-based semi-supervised learning technique to determine Gaussian mixture modeling to find parameters for an underlying model based on training and testing data. The model may then be used to classify the testing data.

In an example, the machine learning system 101 may use an output from a combination of the second and third subsystem 104 and 106 when both E=1 and E=2 are set. The ensemble output may be combined, such as by using an average of the probability of outputs or a weighted average, geometric average, or the like. In another example, both the second and the third subsystem 104 and 106 may be used, and the outputs may be compared, such as by using one of the systems as a backup or check to the other.

The machine learning system 101 using the second subsystem 104 or the third subsystem 106 may provide resiliency against a large class of evasion attacks, which would otherwise weaken the machine learning system 101. The machine learning system 101 may apply techniques of sparse representation or semi-supervised learning to represent or compress received signals to detect malware. Evasion attacks such as data poisoning may attempt to corrupt training data. Specifically, distribution of training data may impact both the performance of the machine learning system 101 but also its vulnerability. By using these techniques, the machine learning system 101 may identify the most relevant and uncontaminated training samples, defend the machine learning framework, and produce stable and superior classification results.

The second or third subsystem 104 or 106 may be used when incoming data is noisy. In an example, the first subsystem 102 may assume data is drawn from a certain probabilistic distribution. However real data may be noisy or contaminated. The performance of classifiers within the first subsystem 102 may degrade significantly when the data is contaminated. The second and third subsystem 104 and 106 are robust against model misspecification, such as when the training data is not from a certain distribution.

In the first system 101, when feature extraction is used with classifiers such as nearest neighbor or nearest subspace, determining feature transformation is determinative of how successful the machine learning system 101 may be. For example, using a principal component analysis (PCA) technique with the first system 101 relies on selecting a number of principal components 'd.' When the parameter d is not properly specified, degradation of classification accuracy may result. In practice, optimal or universally principled techniques for establishing an optimal number of principal components is often impossible. By using the second or third subsystem 104 or 106, the machine learning system 101 may avoid selecting an optimal choice of feature transformation by producing stable robust classification performance for different selections of parameters.

Figure 2:
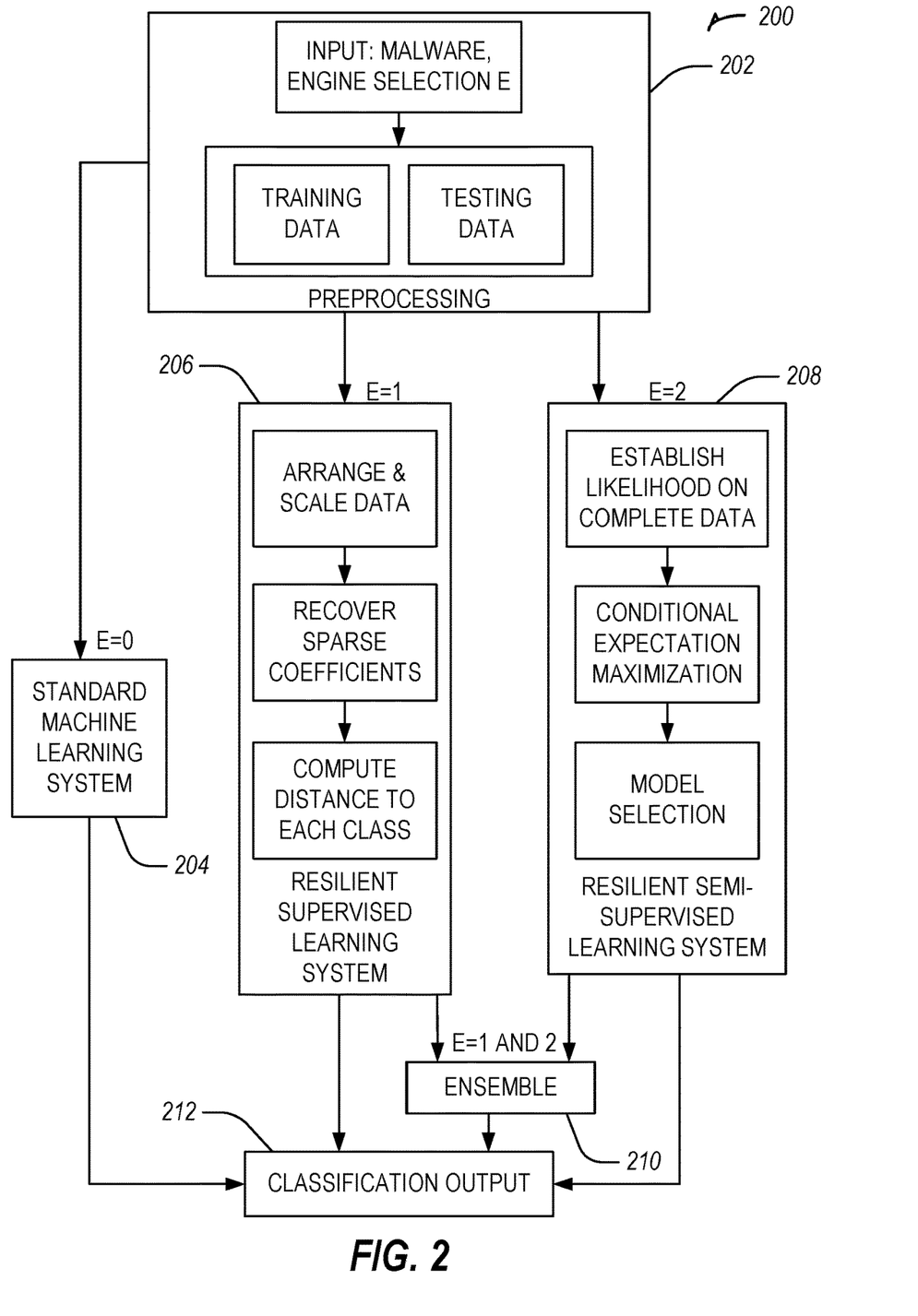
FIG. 2 illustrates a block diagram showing malware evasion attack prevention in accordance with some embodiments.

FIG. 2 illustrates a block diagram 200 showing malware evasion attack prevention in accordance with some embodiments. The block diagram 200 includes a preprocessing block 202 to receive input, such as binaries, function calls, files, malware, etc. In an example, the inputs at the preprocessing block 202 may include malware data, such as binaries, bytecode, executables, application packages (e.g., an Android package kit (APK)), to which n-gram may be applied to extract features. The preprocessing block 202 may separate labeled data from unlabeled data to generate a training data set and a testing data set.

At the preprocessing block 202, a learning system may be selected (e.g., a value E may be a 1-bit identifier which may be set to select the learning system). The selection may include a standard machine learning system (e.g., using malware classifiers such as support vector machine, k-nearest neighbor, etc.) when E=0 represented by standard machine learning system block 204, a resilient supervised learning system using sparse coding when E=1 represented by resilient supervised learning system block 206, or a resilient semi-supervised learning system when E=2 represented by resilient semi-supervised learning system block 208. In an example, both E=1 and E=2 may be selected to use output of both the resilient supervised learning system block 206 and the resilient semi-supervised learning system block 208. The output may be an ensemble output represented by ensemble block 210. The output may include separate outputs that may be compared to each other, such as to check validity of a first output using a second output or used as backups to each other in cases where errors occur. The output may include an average, such as a geometric average of the outputs as an ensemble value.

In an example, the resilient supervised learning system block 206 is selected (e.g., E=1), when there is a contamination or a suspected contamination in the training data, such as due to an evasion attack. The resilient supervised learning system block 206 uses sparse representation for robust malware classification. A sparse representation of a test file binary may be recovered using the resilient supervised learning system block 206 with respect to binaries in the training data. The recovered sparse representation coefficients may be used to classify the test file binary.

For example, the incoming test file binary may be labeled as 'b.' Using a number 'n' of binaries in the training set, which may be denoted by $T=\{b_1, b_2, \ldots, b_n\} \in R^{n+m}$. Each binary $b_1$ may be represented as a vector, such as n-gram, to denote whether n items of functions exist. In an example, there are K−1 classes of malware, and 1 class of benign files, for K total classes. The training dataset may be normalized such that each column has $L_2$-norm equal to 1. In the training dataset, the training binaries of each class may be concatenated such that a dictionary D of binary samples D=$\{D_1, \ldots, D_K\} \in R^{n+m}$ are built. The test file binary may be normalized. The normalized n-gram representation vector may be denoted by $\phi$.

To recover the sparse coefficients, a L_1-minimization problem represented by Equation 1, below may be solved.

$$\text{argmin } \|\beta\| \text{ subject to } \phi = D\beta + \epsilon \quad \text{Eq. 1}$$

In Equation 1, $\beta$ is the sparse representation of the test binary in terms of the training binaries, and the parameter $\epsilon$ is a noise threshold or a sparsity level for the optimization problem represented by Equation 1. In an example, a greedy pursuit algorithm may be used. For example, an orthogonal matching pursuit may iteratively and adaptively solve the optimization problem of Equation 1. In another example, other optimization techniques may be used to solve Equation 1.

After the sparse coefficients are recovered, a distance function may be used to determine distances from $\phi$ to each class $k \in \{1, 2, \ldots, K\}$. An example distance function is represented by Equation 2 below.

$$r_k(\phi) = \|\phi - D\beta_k\| \quad \text{Eq. 2}$$

In Equation 2, the recovered coefficients corresponding to k-th class are defined by Equation 3 below.

$$\beta_k = [0, \ldots 0, \beta_{k,1}, \ldots, \beta_{k,nk}, \ldots 0] \in R^m \quad \text{Eq. 3}$$

In an example, the incoming sample may be classified based on a shortest distance to the class. In another example, other factors may be used, such as a confidence range or when using other distance functions. In an example, the classification may be performed using Equation 4, below.

$$Y = \text{argmin}_k(r_k(\phi)) \quad \text{Eq. 4}$$

Figure 3:
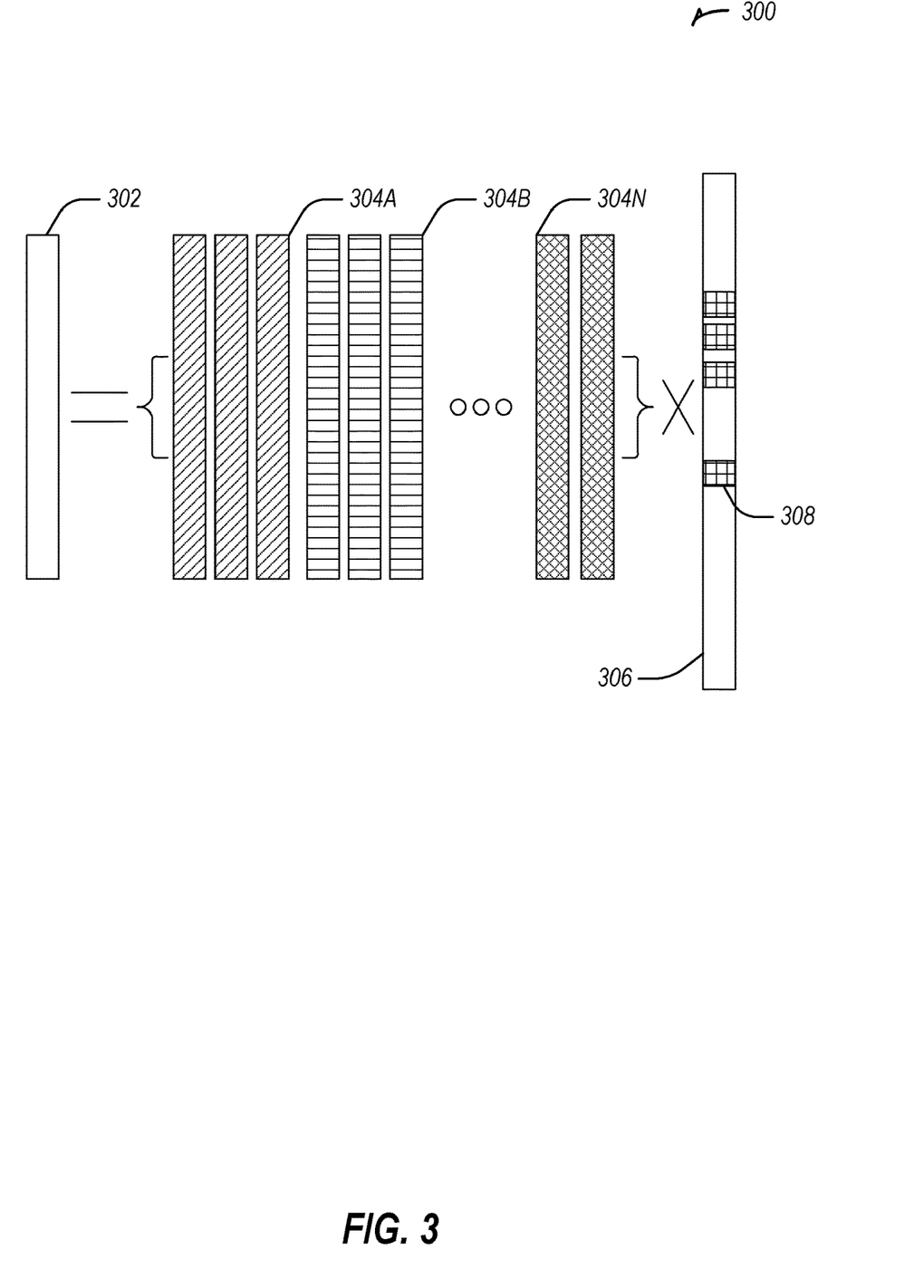
FIG. 3 illustrates a block diagram of a sparse representation classification for malware detection in accordance with some embodiments.

A more detailed depiction of the sparse representation classifier applied for malware detection is shown in FIG. 3, below.

In an example, the resilient semi-supervised learning system block 208 is selected (e.g., E=1), when the size of the training data is much smaller than the size of the test data. For example, when there is a limited amount of labeled data or a low ratio of labeled to unlabeled data input to the preprocessing block 202. Unlabeled data is often cheaper or less time consuming to obtain than labeled data, which requires classification, such as by a person. To achieve robust classification performance when there is, for example, insufficient labeled data to use the resilient supervised learning system block 206, E=2 may be selected for the resilient semi-supervised learning system block 208. The semi-supervised learning system may use both labeled and unlabeled data to update a classifier and achieves improved classification over traditional classifiers such as support vector machine, such as may be used in the standard machine learning block 204.

The resilient semi-supervised learning system block 208 uses a model-based semi-supervised (MBSS) technique. In an example, the MB SS performs Gaussian mixture modeling to find parameters for an underlying model. Using both labeled and unlabeled data, the MBSS may establish a confidence of classification for the data (e.g., training and testing), such as by determining a log-likelihood of classification. The MBSS may use conditional expectation-maximization to estimate the model parameters. In an example, the MBSS may use a model selection criterion, such as a Bayesian information criterion to select the highest probability model. The MBSS may perform a categorical classification such that a file (testing or training) is determined to belong to a class with a maximum posterior probability.

For example, when the inputs are Android APKs, using n=1 for n-gram, the features may be extracted as API names. In an example, the labeled data (i.e., training data) is $(X_1, Y_1), \ldots, (X_n, Y_n)$ and the unlabeled data (i.e., test data) is $X_1, \ldots X_{n+m}$. The MBSS may establish a likelihood problem of the unlabeled (test) and labeled (training) data for classification using Equation 5 below.

$$L_C(\pi, \theta | X_n, Y_n, X_m, Y_m) = \Pi_{i=1}^n \Pi_{k=1}^K [\pi_k f(x_i | \theta_k)^{Y_{ik}}]$$
$$\Pi_{i=n+1}^{n+m} \Pi_{k=1}^K [\pi_k f(X_j | \theta_k)]^{\hat{Y}_{jk}} \quad \text{Eq. 5}$$

In an example, the MBSS may use conditional expectation-maximization (CEM) to estimate the parameters using Equations 6-7 below.

$$\hat{\pi}_k^{g+1} = \frac{\sum_{i=1}^n l_{ik} + \sum_{j=n+1}^m \hat{Y}_{jk}^{g+1}}{n+m} \quad \text{Eq. 6}$$

$$\hat{\mu}_k^{g+1} = \frac{\sum_{i=1}^n l_{ik} X_i + \sum_{j=n+1}^{n+m} \hat{Y}_{jk}^{g+1}}{\sum_{i=1}^n l_{ik} + \sum_{j=n+1}^{n+m} \hat{Y}_{jk}^{g+1}} \quad \text{Eq. 7}$$

To estimate the covariance matrix, the MBSS may apply eigen-decomposition, which results in several Gaussian mixture models. The Bayesian information criterion may be used to select a most or closest fitted model. The output of the selection may include an optimal model (e.g., a closest fitted model), which may be used to determine a classification for a file of the test set. The file of the test set may be given a probability to indicate its class membership (e.g., a confidence level for the classification).

When classification of a test file is completed, whether by the standard machine learning system block 204, the resilient supervised learning system block 206, the resilient semi-supervised learning system block 208, or as a result of the ensemble block 210, an output is sent to the classification output block 212. The classification output block 212 may output the classification of the file. In an example, the classification output block 212 may issue an alert, send the classification to a display, save the classification for outputting the classification with classifications of other files of the test data, or the like. In another example, the classification output block 212 may block an IP address of a source of the file, prevent the file from reaching another portion of a machine learning system, roll back a machine learning system to a previous state before the file was received, label the file as malware or benign, output the label, store the label, or the like.

FIG. 3 illustrates a block diagram 300 of a sparse representation classification for malware detection in accordance with some embodiments. The block diagram 300 illustrates an equation to solve to determine the sparse representation classification of a test file 302. The test file 302 may include an incoming test binary file, a call function, an Android APK, etc. The test file 302 may be classified according to training samples, such as training samples 304A-304N within a dictionary of binaries of training samples. In an example, one or more samples in the training samples 304A-304N may be contaminated by an adversarial attack. In another example, the test file 302 may be contaminated by an adversarial attack. The training samples 304A-304N include corresponding binary types with a known class (e.g., based on a label), with each type designated in the block diagram 300 by a different shading. A sparse representation classifier 306 may be determined to classify the test file 302 in terms of the training samples 304A-304N. As shown in the block diagram 300, the test file 302 is represented by the training samples 304A-304N cross multiplied by the sparse representation classifier 306. To solve for relevant coefficients (e.g., 308) of the sparse representation classifier 306, an iterative process may be conducted. The relevant coefficients (e.g., 308) may be binary (e.g., 1 when a respective training sample is to be used to represent the test file 302 and 0 when a respective training sample is not to be used to represent the test file 302). In an example, the recovered sparse coefficients, such as the relevant coefficient 308 within the sparse representation classifier 306, may be nonzero entries (e.g., coefficient 308) and other spaces may be zero entries. In an example, the nonzero relevant coefficients (e.g., 308) may be weighted. For example, a first training sample 304A may be weighted more heavily than a second training sample 304B, while both are nonzero, to represent the test file 302. The test file 302 may include a vectorized representation of the test file, including, for example, 'm' features. The training samples 304A-304N may be represented by vectors and labeled as to whether they are contaminated or not.

Figure 4:
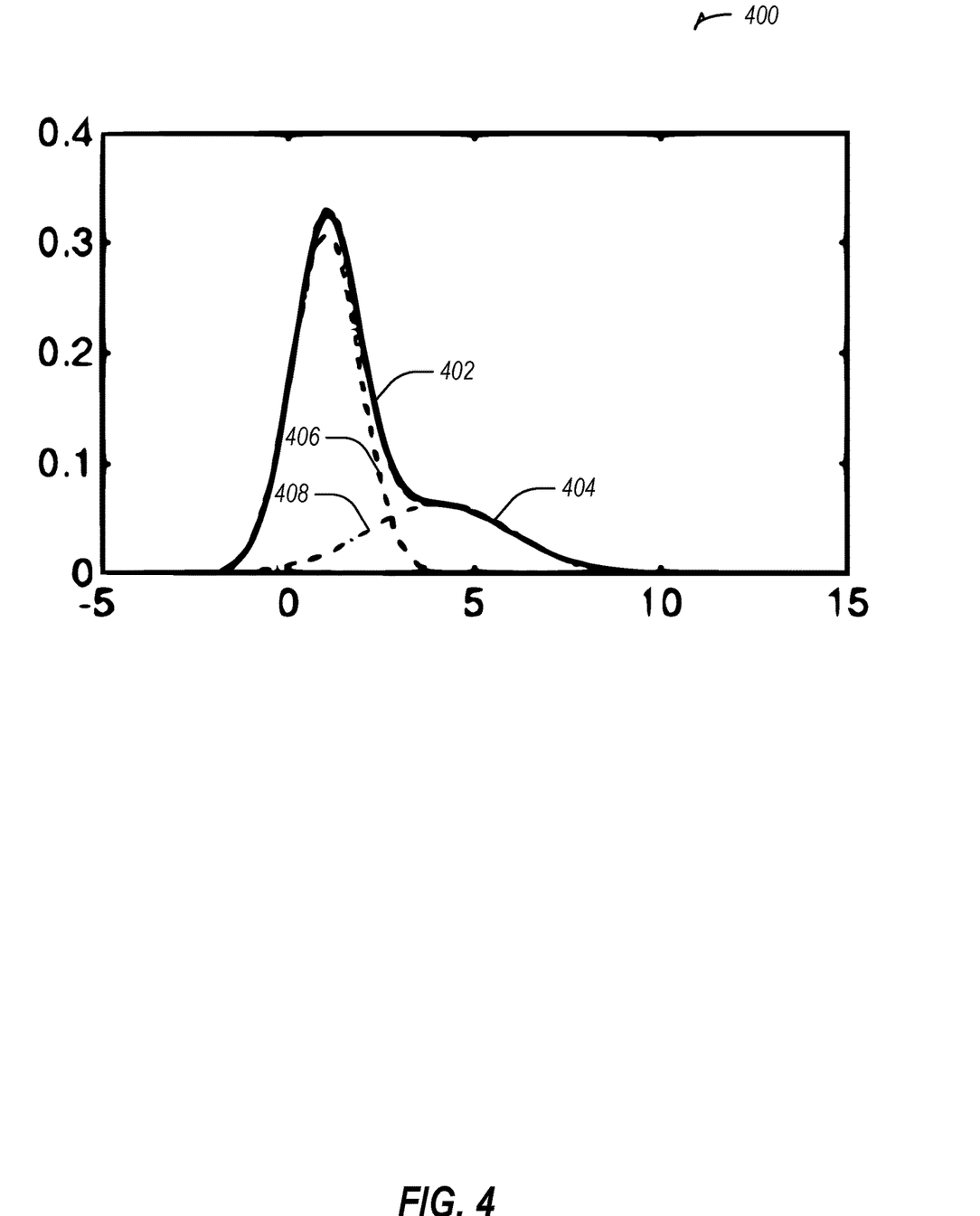
FIG. 4 illustrates a graph showing a mixture of two Gaussians in accordance with some embodiments.

FIG. 4 illustrates a graph 400 showing a mixture of two Gaussians in accordance with some embodiments. The graph illustrates a first Gaussian component 406, a second Gaussian component 408, and a mixture model 402 including both Gaussian components 406 and 408. The mixture model 402 is not a bell curve like the two Gaussian components 406 and 408. In an example, an estimate (e.g., from an MBSS as described above) of the mixture model 402 may be represented by an estimated model of Gaussians 404. The estimated model 404 and the mixture model 402 are close enough to be indistinguishable on the scale displayed in the graph 400.

Figure 5:
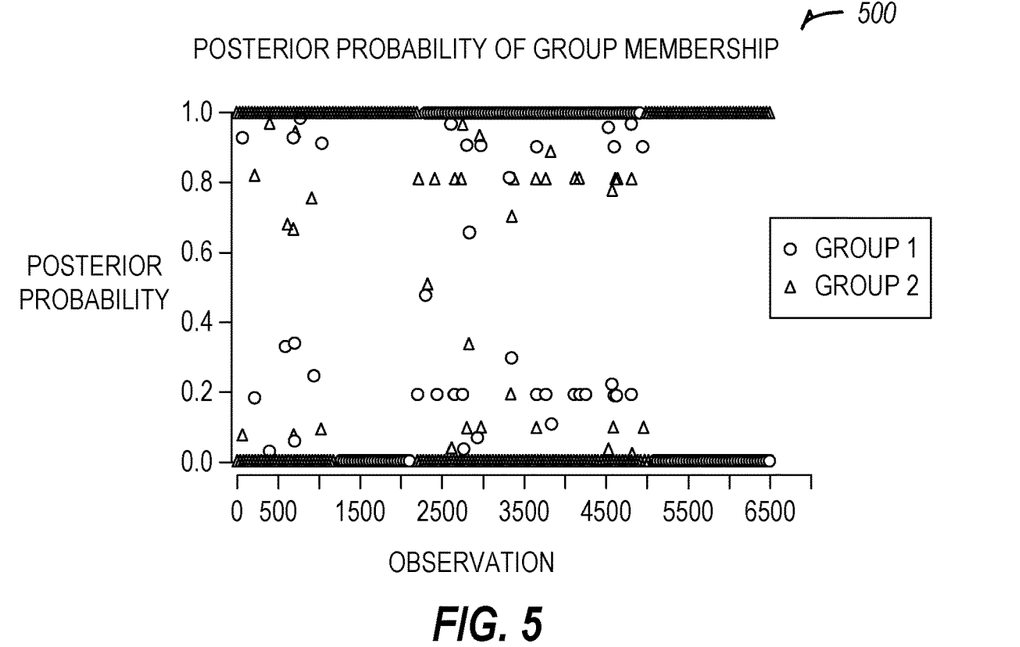
FIGS. 5-6 illustrate graphs showing results of model-based semi-supervised machine learning systems in accordance with some embodiments.
Figure 6:
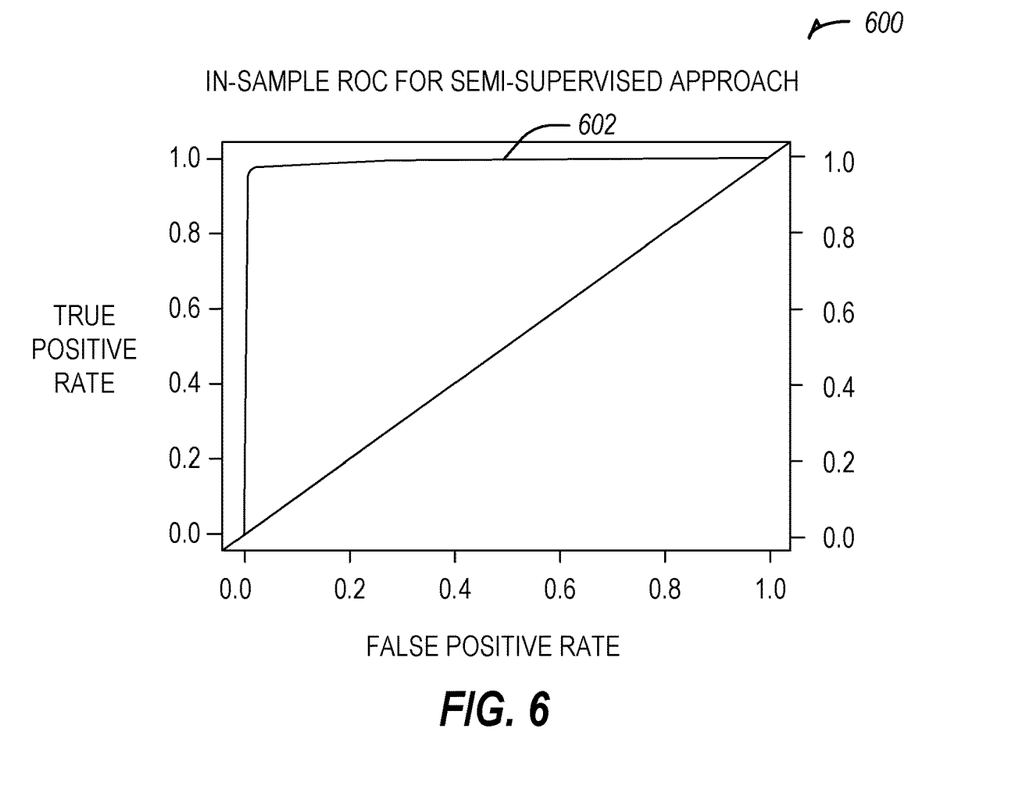

FIGS. 5-6 illustrate graphs 500 and 600 showing results of model-based semi-supervised machine learning systems in accordance with some embodiments.

Graph 500 includes posterior probabilities for test files classified by an MBSS system. In the examples shown in the graph 500, Group 1 represents allegedly benign files and Group 2 represents allegedly malicious files. The vast majority of the test files are classified with a posterior probability of 1.0 or 0.0, representing 100% or 0% probability of being included in a particular class. Almost all of the test files fall within a 20% range of probability (e.g., below 20% or above 80%), with only a few samples in the middle range. As seen in the graph 500, some files indicated as allegedly benign from Group 1 are indicated by the MBSS system as not belonging to Group 1 (indicating with the 0.0 posterior probability that the files are actually malicious and are misclassified). Similarly, some files indicated as allegedly malicious from Group 2 are benign.

In an example, the posterior probability may be used to combine results from the semi-supervised learning system with results from the supervised learning system. For example, results may be weighted using the posterior probabilities.

The graph 600 illustrates a receiver operating characteristic (ROC) curve 602 that results from the MBSS system analysis. The ROC curve 602 shows how accurate the probability predictions are from graph 500. The true positive rate shown on the y-axis of graph 600 illustrates that the vast majority of samples have a true positive rate near 1.0, with very few false positives. Graph 500 shows a confidence level for the MBSS technique, and graph 600 shows how accurate those confidences are. As seen in graphs 500 and 600, the results have a high level of confidence and the confidence levels are highly accurate.

Figure 7A:
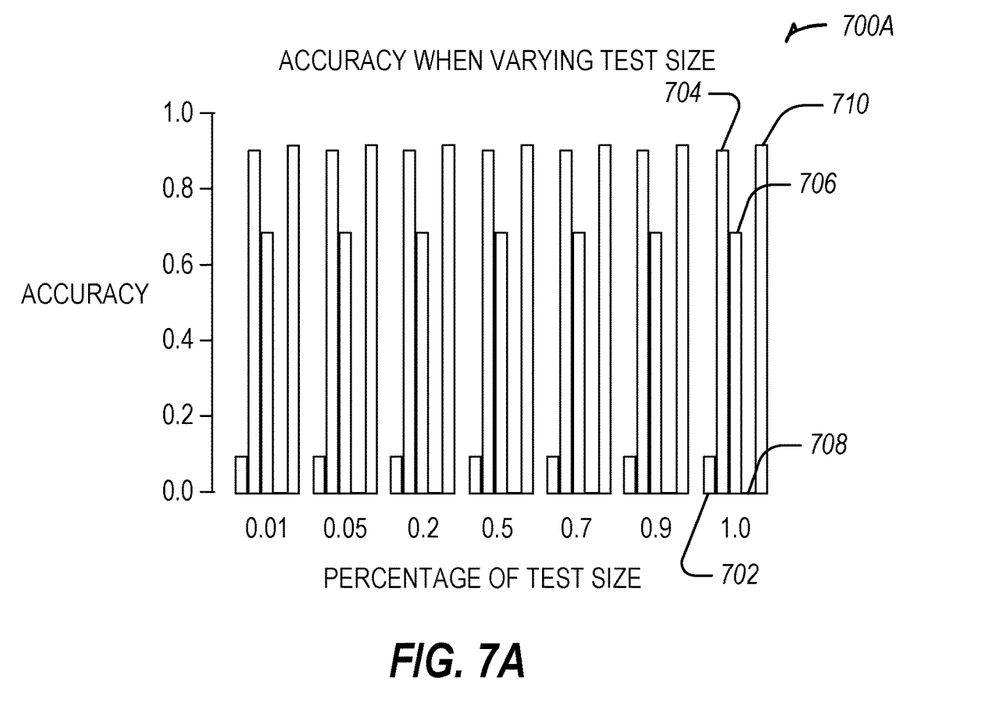
FIGS. 7A-7B illustrate graphs showing accuracy of varying test size for various machine learning techniques in accordance with some embodiments.
Figure 7B:
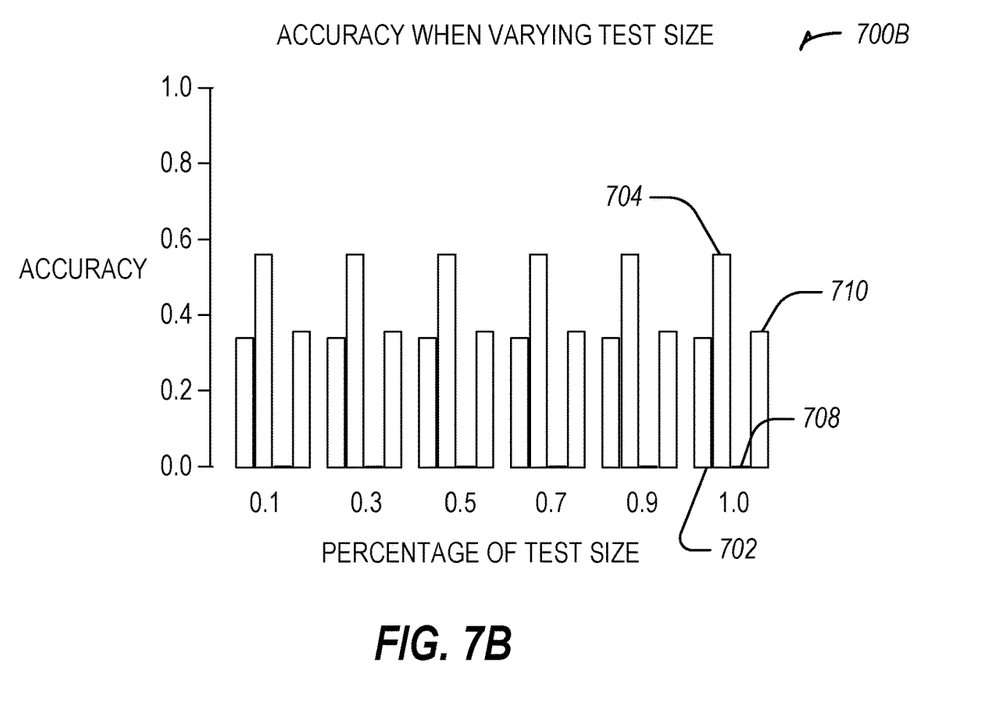

FIGS. 7A-7B illustrate graphs 700A and 700B showing accuracy of varying test size for various machine learning techniques in accordance with some embodiments. FIG. 7A includes graph 700A showing that the MBSS technique 704 achieves a robust performance and is superior in accuracy to a radial support vector machine technique 708, a nearest neighbor technique 706, and a linear discriminant analysis technique 702. The MBSS technique 704 is similar in accuracy to a linear support vector machine technique 710. Further, the linear support vector machine technique 710 is vulnerable to adversarial attacks, so despite the similar accuracy, the MBSS technique 704 is superior to the linear support vector machine technique 710 when an adversarial attack occurs or is suspected. The MBSS technique 704 is robust across the percentage of the test size as well.

FIG. 7B shows in graph 700B that the MBSS technique 704 is superior in accuracy to all the other test results shown (e.g., 702, 706, and 708), including the linear support vector machine technique 710. Similarly to graph 700A, in graph 700B, although less accurate for this test group than the accuracy shown for the test group in graph 700A, the MBSS technique 704 shows robustness over the percentage of test size. Further, the accuracy of the MBSS technique 704 for the test group shown in graph 700B is significantly higher than the accuracy of any of the other techniques.

Figure 8:
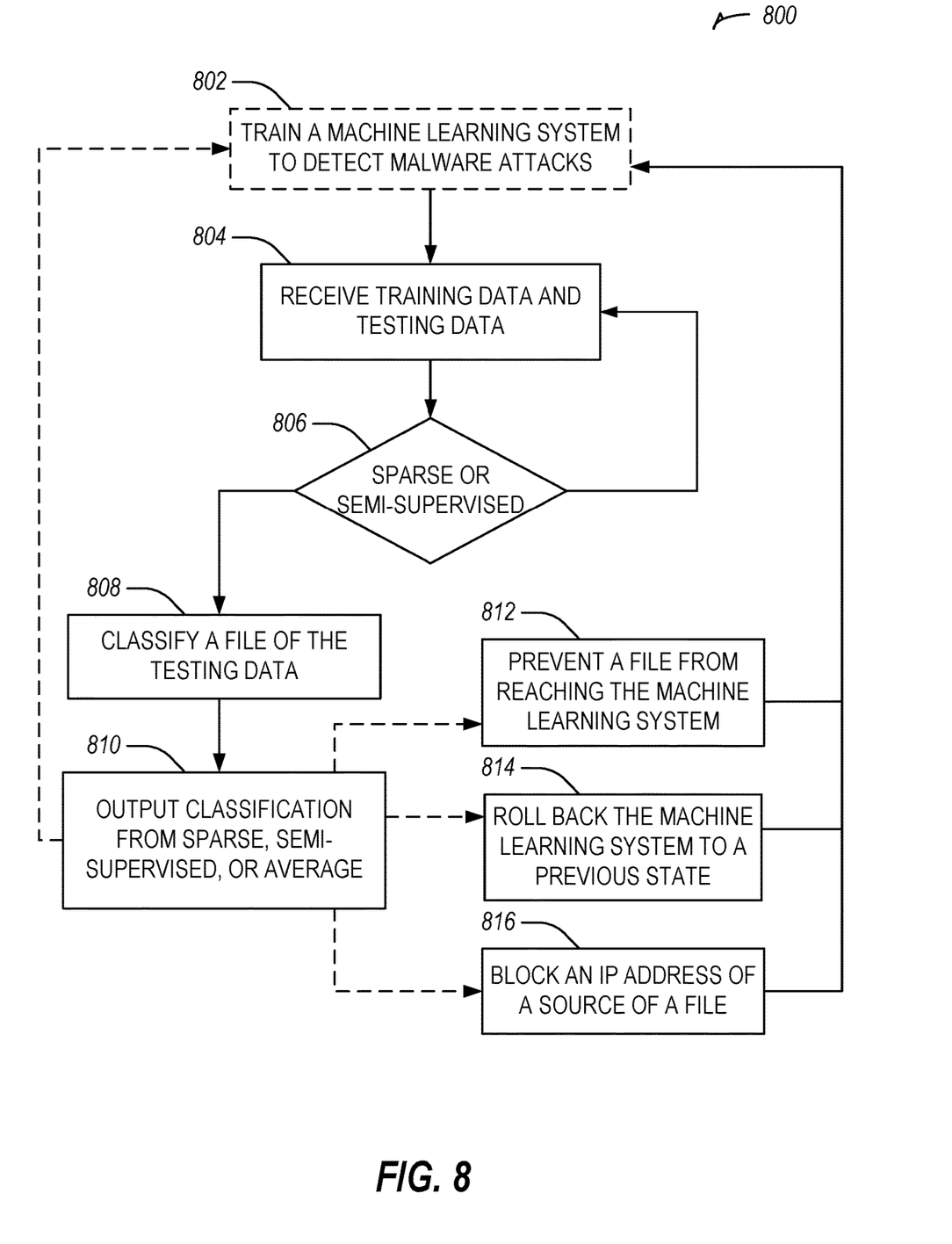
FIG. 8 illustrates a flowchart showing a technique for preventing evasion attacks on a malware detection system in accordance with some embodiments.

FIG. 8 illustrates a flowchart showing a technique 800 for preventing evasion attacks on a malware detection system in accordance with some embodiments. The technique 800 includes an optional operation 802 to train a machine learning system to detect malware attacks. The technique 800 includes an operation 804 to receive training data and testing data. The technique 800 includes a decision operation 806 to determine whether to use sparse coding representation supervised learning or semi-supervised resilient learning. The technique 800 includes an operation 808 to classify a file of the testing data using the chosen learning system from decision operation 806. In an example, when one of the sparse or semi-supervised learning systems are chose at decision operation 806, the technique 800 may return to operation 804, and the other learning system may be chosen, either on different training or testing data, or on the same training or testing data to produce results from both learning systems.

When sparse coding representation supervised learning is chosen at decision operation 806, the technique 800 includes creating a dictionary of samples having classes from training data. The technique 800 may include determining sparse coefficients for the testing data using the dictionary of samples, such as by using a greedy pursuit algorithm, such as an orthogonal matching pursuit algorithm. In an example, determining the sparse coefficients may include iteratively solving an optimization objective function. Operation 808 may include classifying the testing data as malware or benign using the sparse coefficients and the classes of respective samples according to a sparse classification. Operation 808 may include computing a distance from files in the testing data to each class in the dictionary of samples. Operation 808 may include determining a closest class, and classifying a file in the testing data according to the closest class. The technique 800 may include, when using sparse coding, determining the sparse coefficients may include scaling the testing data.

When semi-supervised resilient learning is chosen at decision operation 806, the technique 800 includes estimating model parameters for the training data and the testing data using a conditional expectation maximization function. Estimating the model parameters may include using Gaussian mixture modeling. The technique 800 may include selecting a closest fitted model using the estimated model parameters. In an example, selecting the closest fitted model includes using Bayesian information criterion. The technique 800 may include determining a likelihood of at least one file of the testing data being malware or benign using the closest fitted model. Determining the likelihood may include determining a log-likelihood. In an example, operation 808 includes classifying the at least one file based on the likelihood according to a semi-supervised classification. Operation 808 may include classifying the at least one file using a categorical classification to determine a class where the at least one file has a maximum posterior probability.

The technique 800 includes an operation 810 to output the classification. The output may be an output from the sparse coding representation supervised learning, the semi-supervised resilient learning, or a combination of the two. For example, the determination at decision block 806 may include selecting both techniques to be run concurrently or in sequence. The technique 800 includes optional operations 812 to prevent a file from reaching the machine learning system, 814 to roll back the machine learning system to a previous state, or 816 to block an IP address of a source of a file. Optional operation 812 may include preventing a file from being used by the machine learning system.

Figure 9:
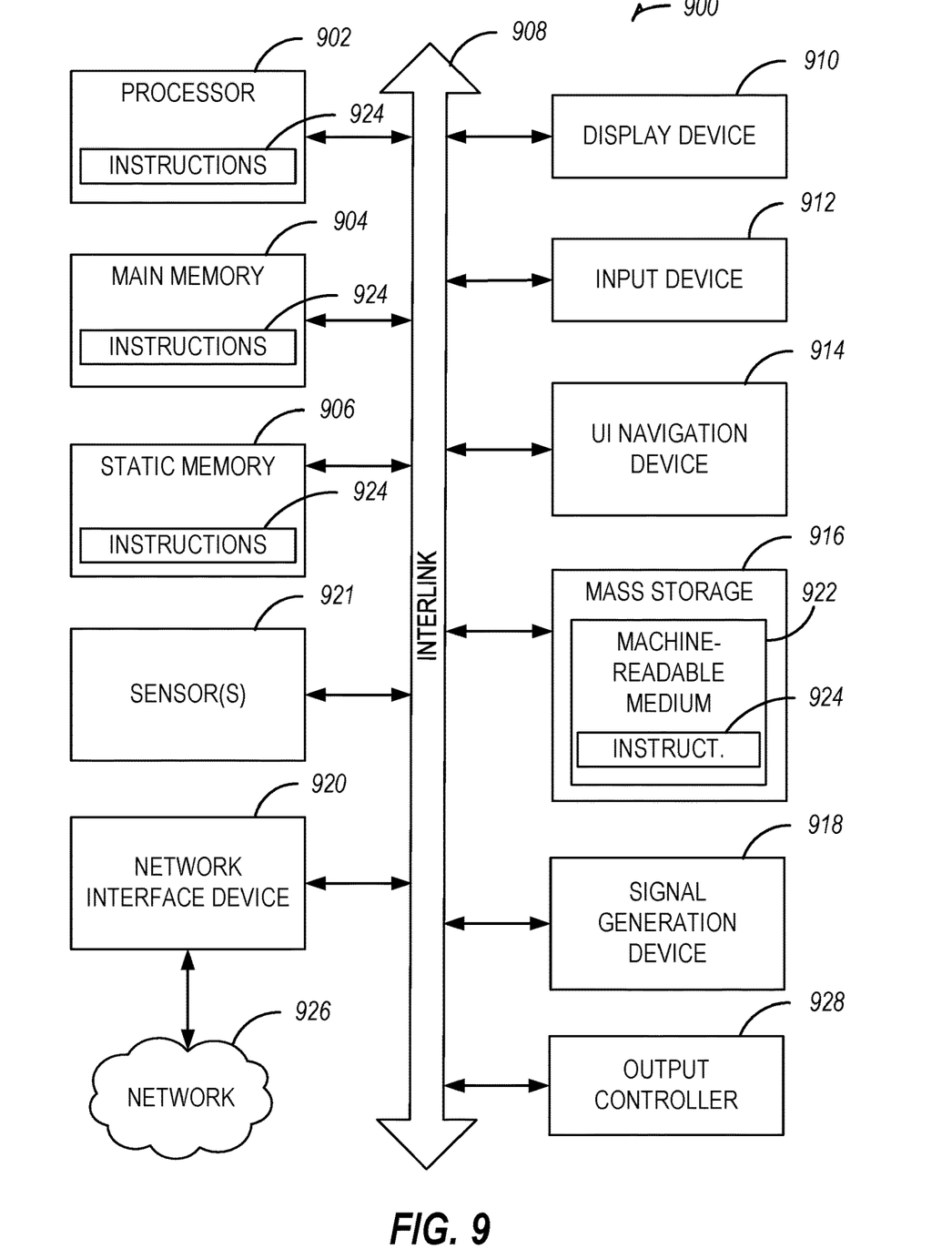
FIG. 9 illustrates generally an example of a block diagram of a machine upon which any one or more of the techniques (e.g., methodologies) discussed herein may perform in accordance with some embodiments.

FIG. 9 illustrates generally an example of a block diagram of a machine 900 upon which any one or more of the techniques (e.g., methodologies) discussed herein may perform in accordance with some embodiments. In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In an example, the hardware may include configurable execution units (e.g., transistors, circuits, etc.) and a computer readable medium containing instructions, where the instructions configure the execution units to carry out a specific operation when in operation. The configuring may occur under the direction of the executions units or a loading mechanism. Accordingly, the execution units are communicatively coupled to the computer readable medium when the device is operating. In this example, the execution units may be a member of more than one module. For example, under operation, the execution units may be configured by a first set of instructions to implement a first module at one point in time and reconfigured by a second set of instructions to implement a second module.

Machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a display unit 910, an alphanumeric input device 912 (e.g., a keyboard), and a user interface (UI) navigation device 914 (e.g., a mouse). In an example, the display unit 910, alphanumeric input device 912 and UI navigation device 914 may be a touch screen display. The machine 900 may additionally include a storage device (e.g., drive unit) 916, a signal generation device 918 (e.g., a speaker), a network interface device 920, and one or more sensors 921, such as a global positioning system (GPS) sensor, compass, accelerometer, or other sensor. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 916 may include a machine readable medium 922 that is non-transitory on which is stored one or more sets of data structures or instructions 924 (e.g., software) embodying or utilized by any one or more of the techniques or functions described herein. The instructions 924 may also reside, completely or at least partially, within the main memory 904, within static memory 906, or within the hardware processor 902 during execution thereof by the machine 900. In an example, one or any combination of the hardware processor 902, the main memory 904, the static memory 906, or the storage device 916 may constitute machine readable media.

While the machine readable medium 922 is illustrated as a single medium, the term "machine readable medium" may include a single medium or multiple media (e.g., a centralized or distributed database, or associated caches and servers) configured to store the one or more instructions 924.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software.

VARIOUS NOTES & EXAMPLES

Each of these non-limiting examples may stand on its own, or may be combined in various permutations or combinations with one or more of the other examples.

Example 1 is a method for preventing evasion attacks on a malware detection system, the method comprising: creating a dictionary of samples having classes from training data; receiving testing data; determining sparse coefficients for the testing data using the dictionary of samples; classifying the testing data as malware or benign using the sparse coefficients and the classes of respective samples according to a sparse classification; and outputting the sparse classification.

In Example 2, the subject matter of Example 1 includes, estimating model parameters for the training data and the testing data using a conditional expectation maximization function; selecting a closest fitted model using the estimated model parameters; and determining a likelihood of files of the testing data being malware or benign using the closest fitted model; classifying the files of the testing data based on the likelihood according to a semi-supervised classification; and outputting the semi-supervised classification.

In Example 3, the subject matter of Example 2 includes, selecting the sparse classification over the semi-supervised classification based on determining that a feature of the testing data has been added, removed, or contaminated.

In Example 4, the subject matter of Examples 2-3 includes, wherein outputting the sparse classification includes outputting an average of the sparse classification and the semi-supervised classification.

In Example 5, the subject matter of Examples 1-4 includes, wherein determining the sparse coefficients includes using a greedy pursuit algorithm.

In Example 6, the subject matter of Example 5 includes, wherein the greedy pursuit algorithm includes an orthogonal matching pursuit algorithm.

In Example 7, the subject matter of Examples 1-6 includes, wherein determining the sparse coefficients includes iteratively solving an optimization objective function.

In Example 8, the subject matter of Examples 1-7 includes, wherein classifying the testing data includes computing a distance from files in the testing data to each class in the dictionary of samples, and determining a closest class.

In Example 9, the subject matter of Examples 1-8 includes, wherein determining the sparse coefficients includes scaling the testing data.

In Example 10, the subject matter of Examples 1-9 includes, wherein, in response to classifying the testing data as malware, further comprising blocking an IP address of a source of at least a portion of the testing data.

In Example 11, the subject matter of Examples 1-10 includes, training a machine learning system to detect malware attacks using the testing data.

In Example 12, the subject matter of Example 11 includes, wherein, in response to classifying the testing data as malware, further comprising preventing at least a portion of the testing data from reaching the machine learning system.

In Example 13, the subject matter of Examples 11-12 includes, wherein, in response to classifying the testing data as malware, further comprising causing the machine learning system to perform a roll back to a previous state before the testing data was received.

Example 14 is at least one machine-readable medium including instructions for operation of a computing system, which when executed by a machine, cause the machine to perform operations of any of the methods of Examples 1-13.

Example 15 is an apparatus comprising means for performing any of the methods of Examples 1-13.

Example 16 is a malware detection system for preventing evasion attacks, the malware detection system comprising: an evasion detection system to: create a dictionary of samples having classes from training data; receive testing data; determine sparse coefficients for the testing data using the dictionary of samples; classify the testing data as malware or benign using the sparse coefficients and the classes of respective samples according to a sparse classification; and output the sparse classification.

In Example 17, the subject matter of Example 16 includes, wherein the evasion detection system is further to: estimate model parameters for the training data and the testing data using a conditional expectation maximization function; select a closest fitted model using the estimated model parameters; and determine a likelihood of files of the testing data being malware or benign using the closest fitted model; classify the files of the testing data based on the likelihood according to a semi-supervised classification; and output the semi-supervised classification.

In Example 18, the subject matter of Example 17 includes, wherein the evasion detection system is further to select the sparse classification over the semi-supervised classification based on determining that a feature of the testing data has been added, removed, or contaminated.

In Example 19, the subject matter of Examples 17-18 includes, wherein to output the sparse classification includes to output an average of the sparse classification and the semi-supervised classification.

In Example 20, the subject matter of Examples 16-19 includes, wherein to determine the sparse coefficients includes using a greedy pursuit algorithm.

In Example 21, the subject matter of Example 20 includes, wherein the greedy pursuit algorithm includes an orthogonal matching pursuit algorithm.

In Example 22, the subject matter of Examples 16-21 includes, wherein to determine the sparse coefficients includes to iteratively solve an optimization objective function.

In Example 23, the subject matter of Examples 16-22 includes, wherein to classify the testing data includes to compute a distance from files in the testing data to each class in the dictionary of samples, and to determine a closest class.

In Example 24, the subject matter of Examples 16-23 includes, wherein to determine the sparse coefficients includes to scale the testing data.

In Example 25, the subject matter of Examples 16-24 includes, wherein, in response to classifying the testing data as malware, the evasion detection system is further to block an IP address of a source of at least a portion of the testing data.

In Example 26, the subject matter of Examples 16-25 includes, wherein the evasion detection system is further to train a machine learning system to detect malware attacks using the testing data.

In Example 27, the subject matter of Example 26 includes, wherein, in response to classifying the testing data as malware, the evasion detection system is further to prevent at least a portion of the testing data from reaching the machine learning system.

In Example 28, the subject matter of Examples 26-27 includes, wherein, in response to classifying the testing data as malware, the evasion detection system is further to cause the machine learning system to perform a roll back to a previous state before the testing data was received.

Example 29 is at least one non-transitory machine-readable medium including instructions for preventing evasion attacks on a malware detection system, which when executed by a machine, cause the machine to: create a dictionary of samples having classes from training data; receive testing data; determine sparse coefficients for the testing data using the dictionary of samples; classify the testing data as malware or benign using the sparse coefficients and the classes of respective samples according to a sparse classification; and output the sparse classification.

In Example 30, the subject matter of Example 29 includes, instructions to: estimate model parameters for the training data and the testing data using a conditional expectation maximization function; select a closest fitted model using the estimated model parameters; and determine a likelihood of files of the testing data being malware or benign using the closest fitted model; classify the files of the testing data based on the likelihood according to a semi-supervised classification; and output the semi-supervised classification.

In Example 31, the subject matter of Example 30 includes, instructions to select the sparse classification over the semi-supervised classification based on determining that a feature of the testing data has been added, removed, or contaminated.

In Example 32, the subject matter of Examples 30-31 includes, wherein to output the sparse classification includes to output an average of the sparse classification and the semi-supervised classification.

In Example 33, the subject matter of Examples 29-32 includes, wherein to determine the sparse coefficients includes using a greedy pursuit algorithm.

In Example 34, the subject matter of Example 33 includes, wherein the greedy pursuit algorithm includes an orthogonal matching pursuit algorithm.

In Example 35, the subject matter of Examples 29-34 includes, wherein to determine the sparse coefficients includes to iteratively solve an optimization objective function.

In Example 36, the subject matter of Examples 29-35 includes, wherein to classify the testing data includes to compute a distance from files in the testing data to each class in the dictionary of samples, and to determine a closest class.

In Example 37, the subject matter of Examples 29-36 includes, wherein to determine the sparse coefficients includes to scale the testing data.

In Example 38, the subject matter of Examples 29-37 includes, wherein, in response to classifying the testing data as malware, further including instructions to block an IP address of a source of at least a portion of the testing data.

In Example 39, the subject matter of Examples 29-38 includes, instructions to train a machine learning system to detect malware attacks using the testing data.

In Example 40, the subject matter of Example 39 includes, wherein, in response to classifying the testing data as malware, further including instructions to prevent at least a portion of the testing data from reaching the machine learning system.

In Example 41, the subject matter of Examples 39-40 includes, wherein, in response to classifying the testing data as malware, further including instructions to cause the machine learning system to perform a roll back to a previous state before the testing data was received.

Example 42 is an apparatus for preventing evasion attacks on a malware detection system, the apparatus comprising: means for creating a dictionary of samples having classes from training data; means for receiving testing data; means for determining sparse coefficients for the testing data using the dictionary of samples; means for classifying the testing data as malware or benign using the sparse coefficients and the classes of respective samples according to a sparse classification; and means for outputting the sparse classification.

In Example 43, the subject matter of Example 42 includes, means for estimating model parameters for the training data and the testing data using a conditional expectation maximization function; means for selecting a closest fitted model using the estimated model parameters; and means for determining a likelihood of files of the testing data being malware or benign using the closest fitted model; means for classifying the files of the testing data based on the likelihood according to a semi-supervised classification; and means for outputting the semi-supervised classification.

In Example 44, the subject matter of Example 43 includes, means for selecting the sparse classification over the semi-supervised classification based on determining that a feature of the testing data has been added, removed, or contaminated.

In Example 45, the subject matter of Examples 43-44 includes, wherein the means for outputting the sparse classification include means for outputting an average of the sparse classification and the semi-supervised classification.

In Example 46, the subject matter of Examples 42-45 includes, wherein the means for determining the sparse coefficients include means for using a greedy pursuit algorithm.

In Example 47, the subject matter of Example 46 includes, wherein the greedy pursuit algorithm includes an orthogonal matching pursuit algorithm.

In Example 48, the subject matter of Examples 42-47 includes, wherein the means for determining the sparse coefficients include means for iteratively solving an optimization objective function.

In Example 49, the subject matter of Examples 42-48 includes, wherein the means for classifying the testing data include means for computing a distance from files in the testing data to each class in the dictionary of samples, and means for determining a closest class.

In Example 50, the subject matter of Examples 42-49 includes, wherein the means for determining the sparse coefficients include means for scaling the testing data.

In Example 51, the subject matter of Examples 42-50 includes, wherein, in response to classifying the testing data as malware, further comprising means for blocking an IP address of a source of at least a portion of the testing data.

In Example 52, the subject matter of Examples 42-51 includes, means for training a machine learning system to detect malware attacks using the testing data.

In Example 53, the subject matter of Example 52 includes, wherein, in response to classifying the testing data as malware, further comprising means for preventing at least a portion of the testing data from reaching the machine learning system.

In Example 54, the subject matter of Examples 52-53 includes, wherein, in response to classifying the testing data as malware, further comprising means for causing the machine learning system to perform a roll back to a previous state before the testing data was received.

Example 55 is a method for preventing evasion attacks on a malware detection system, the method comprising: receiving training data and testing data; estimating model parameters for the training data and the testing data using a conditional expectation maximization function; selecting a closest fitted model using the estimated model parameters; and determining a likelihood of at least one file of the testing data being malware or benign using the closest fitted model; classifying the at least one file based on the likelihood according to a semi-supervised classification; and outputting the semi-supervised classification.

In Example 56, the subject matter of Example 55 includes, creating a dictionary of samples having classes from the training data; determining sparse coefficients for the testing data using the dictionary of samples; classifying the testing data as malware or benign using the sparse coefficients and the classes of respective samples according to a sparse classification; and outputting the sparse classification.

In Example 57, the subject matter of Example 56 includes, selecting the semi-supervised classification over the sparse classification based on determining that a proportion of training data to testing data is below a threshold.

In Example 58, the subject matter of Examples 56-57 includes, selecting the semi-supervised classification over the sparse classification based on determining that a distribution of the testing data and a distribution of the training data are different.

In Example 59, the subject matter of Examples 56-58 includes, wherein outputting the semi-supervised classification includes outputting an average of the sparse classification and the semi-supervised classification.

In Example 60, the subject matter of Examples 55-59 includes, wherein estimating the model parameters includes using Gaussian mixture modeling.

In Example 61, the subject matter of Examples 55-60 includes, wherein determining the likelihood includes determining a log-likelihood.

In Example 62, the subject matter of Examples 55-61 includes, wherein selecting the closest fitted model includes using Bayesian information criterion.

In Example 63, the subject matter of Examples 55-62 includes, wherein classifying the at least one file based on the likelihood includes using a categorical classification to determine a class where the at least one file has a maximum posterior probability.

In Example 64, the subject matter of Examples 55-63 includes, wherein, in response to classifying the at least one file as malware, further comprising blocking an IP address of a source of the at least one file.

In Example 65, the subject matter of Examples 55-64 includes, training a machine learning system to detect malware attacks using the testing data.

In Example 66, the subject matter of Example 65 includes, wherein, in response to classifying the at least one file as malware, further comprising preventing the at least one file from reaching the machine learning system.

In Example 67, the subject matter of Examples 65-66 includes, wherein, in response to classifying the at least one file as malware, further comprising causing the machine learning system to perform a roll back to a previous state before the at least one file was received.

Example 68 is at least one machine-readable medium including instructions for operation of a computing system, which when executed by a machine, cause the machine to perform operations of any of the methods of Examples 55-67.

Example 69 is an apparatus comprising means for performing any of the methods of Examples 55-67.

Example 70 is a malware detection system for preventing evasion attacks, the malware detection system comprising: an evasion detection system to: receive training data and testing data; estimate model parameters for the training data and the testing data using a conditional expectation maximization function; select a closest fitted model using the estimated model parameters; and determine a likelihood of at least one file of the testing data being malware or benign using the closest fitted model; classify the at least one file based on the likelihood according to a semi-supervised classification; and output the semi-supervised classification.

In Example 71, the subject matter of Example 70 includes, wherein the evasion detection system is further to: create a dictionary of samples having classes from the training data; determine sparse coefficients for the testing data using the dictionary of samples; classify the testing data as malware or benign using the sparse coefficients and the classes of respective samples according to a sparse classification; and output the sparse classification.

In Example 72, the subject matter of Example 71 includes, wherein the evasion detection system is further to select the semi-supervised classification over the sparse classification based on determining that a proportion of training data to testing data is below a threshold.

In Example 73, the subject matter of Examples 71-72 includes, wherein the evasion detection system is further to select the semi-supervised classification over the sparse classification based on determining that a distribution of the testing data and a distribution of the training data are different.

In Example 74, the subject matter of Examples 71-73 includes, wherein to output the semi-supervised classification includes to output an average of the sparse classification and the semi-supervised classification.

In Example 75, the subject matter of Examples 70-74 includes, wherein to estimate the model parameters includes using Gaussian mixture modeling.

In Example 76, the subject matter of Examples 70-75 includes, wherein to determine the likelihood includes to determine a log-likelihood.

In Example 77, the subject matter of Examples 70-76 includes, wherein to select the closest fitted model includes using Bayesian information criterion.

In Example 78, the subject matter of Examples 70-77 includes, wherein to classify the at least one file based on the likelihood includes using a categorical classification to determine a class where the at least one file has a maximum posterior probability.

In Example 79, the subject matter of Examples 70-78 includes, wherein, in response to classifying the at least one file as malware, the evasion detection system is further to block an IP address of a source of the at least one file.

In Example 80, the subject matter of Examples 70-79 includes, wherein the evasion detection system is further to train a machine learning system to detect malware attacks using the testing data.

In Example 81, the subject matter of Example 80 includes, wherein, in response to classifying the at least one file as malware, the evasion detection system is further to prevent the at least one file from reaching the machine learning system.

In Example 82, the subject matter of Examples 80-81 includes, wherein, in response to classifying the at least one file as malware, the evasion detection system is further to cause the machine learning system to perform a roll back to a previous state before the at least one file was received.

Example 83 is at least one non-transitory machine-readable medium including instructions for preventing evasion attacks on a malware detection system, which when executed by a machine, cause the machine to: receive training data and testing data; estimate model parameters for the training data and the testing data using a conditional expectation maximization function; select a closest fitted model using the estimated model parameters; and determine a likelihood of at least one file of the testing data being malware or benign using the closest fitted model; classify the at least one file based on the likelihood according to a semi-supervised classification; and output the semi-supervised classification.

In Example 84, the subject matter of Example 83 includes, instructions to: create a dictionary of samples having classes from the training data; determine sparse coefficients for the testing data using the dictionary of samples; classify the testing data as malware or benign using the sparse coefficients and the classes of respective samples according to a sparse classification; and output the sparse classification.

In Example 85, the subject matter of Example 84 includes, instructions to select the semi-supervised classification over the sparse classification based on determining that a proportion of training data to testing data is below a threshold.

In Example 86, the subject matter of Examples 84-85 includes, instructions to select the semi-supervised classification over the sparse classification based on determining that a distribution of the testing data and a distribution of the training data are different.

In Example 87, the subject matter of Examples 84-86 includes, wherein to output the semi-supervised classification includes to output an average of the sparse classification and the semi-supervised classification.

In Example 88, the subject matter of Examples 83-87 includes, wherein to estimate the model parameters includes using Gaussian mixture modeling.

In Example 89, the subject matter of Examples 83-88 includes, wherein to determine the likelihood includes to determine a log-likelihood.

In Example 90, the subject matter of Examples 83-89 includes, wherein to select the closest fitted model includes using Bayesian information criterion.

In Example 91, the subject matter of Examples 83-90 includes, wherein to classify the at least one file based on the likelihood includes using a categorical classification to determine a class where the at least one file has a maximum posterior probability.

In Example 92, the subject matter of Examples 83-91 includes, wherein, in response to classifying the at least one file as malware, further comprising instructions to block an IP address of a source of the at least one file.

In Example 93, the subject matter of Examples 83-92 includes, instructions to train a machine learning system to detect malware attacks using the testing data.

In Example 94, the subject matter of Example 93 includes, wherein, in response to classifying the at least one file as malware, further comprising instructions to prevent the at least one file from reaching the machine learning system.

In Example 95, the subject matter of Examples 93-94 includes, wherein, in response to classifying the at least one file as malware, further comprising instructions to cause the machine learning system to perform a roll back to a previous state before the at least one file was received.

Example 96 is an apparatus for preventing attacks on a malware detection system, the apparatus comprising: means for receiving training data and testing data; means for estimating model parameters for the training data and the testing data using a conditional expectation maximization function; means for selecting a closest fitted model using the estimated model parameters; and means for determining a likelihood of at least one file of the testing data being malware or benign using the closest fitted model; means for classifying the at least one file based on the likelihood according to a semi-supervised classification; and means for outputting the semi-supervised classification.

In Example 97, the subject matter of Example 96 includes, means for creating a dictionary of samples having classes from the training data; means for determining sparse coefficients for the testing data using the dictionary of samples; means for classifying the testing data as malware or benign using the sparse coefficients and the classes of respective samples according to a sparse classification; and means for outputting the sparse classification.

In Example 98, the subject matter of Example 97 includes, means for selecting the semi-supervised classification over the sparse classification based on determining that a proportion of training data to testing data is below a threshold.

In Example 99, the subject matter of Examples 97-98 includes, means for selecting the semi-supervised classification over the sparse classification based on determining that a distribution of the testing data and a distribution of the training data are different.

In Example 100, the subject matter of Examples 97-99 includes, wherein the means for outputting the semi-supervised classification include means for outputting an average of the sparse classification and the semi-supervised classification.

In Example 101, the subject matter of Examples 96-100 includes, wherein the means for estimating the model parameters include means for using Gaussian mixture modeling.

In Example 102, the subject matter of Examples 96-101 includes, wherein the means for determining the likelihood include means for determining a log-likelihood.

In Example 103, the subject matter of Examples 96-102 includes, wherein the means for selecting the closest fitted model include means for using Bayesian information criterion.

In Example 104, the subject matter of Examples 96-103 includes, wherein the means for classifying the at least one file based on the likelihood include means for using a categorical classification to determine a class where the at least one file has a maximum posterior probability.

In Example 105, the subject matter of Examples 96-104 includes, wherein, in response to classifying the at least one file as malware, further comprising means for blocking an IP address of a source of the at least one file.

In Example 106, the subject matter of Examples 96-105 includes, means for training a machine learning system to detect malware attacks using the testing data.

In Example 107, the subject matter of Example 106 includes, wherein, in response to classifying the at least one file as malware, further comprising means for preventing the at least one file from reaching the machine learning system.

In Example 108, the subject matter of Examples 106-107 includes, wherein, in response to classifying the at least one file as malware, further comprising means for causing the machine learning system to perform a roll back to a previous state before the at least one file was received.

Example 109 is at least one machine-readable medium including instructions that, when executed by processing circuitry, cause the processing circuitry to perform operations to implement of any of Examples 1-108.

Example 110 is an apparatus comprising means to implement of any of Examples 1-108.

Example 111 is a system to implement of any of Examples 1-108.

Example 112 is a method to implement of any of Examples 1-108.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. A malware detection system for preventing evasion attacks, the malware detection system comprising:
   one or more processors coupled to a memory device, the memory device containing instructions which, when executed by the one or more processors, cause the one or more processors to:
   create a dictionary of samples having classes from training data, wherein the training data includes data labeled as malware or benign;
   receive testing data, wherein the testing data is unlabeled as malware or benign;
   select, from a standard classification system, a sparse classification system, or a semi-supervised classification system, the sparse classification system based on determining that a feature of the testing data has been added, removed, or contaminated;
   determine, based on selecting the sparse classification system, sparse coefficients for the testing data using the dictionary of samples;
   classify the testing data as malware or benign using the sparse coefficients and the classes of respective samples according to a sparse classification; and
   output the sparse classification.

2. The malware detection system of claim 1, wherein to determine the sparse coefficients includes using a greedy pursuit algorithm.

3. The malware detection system of claim 2, wherein the greedy pursuit algorithm includes an orthogonal matching pursuit algorithm.

4. The malware detection system of claim 1, wherein to determine the sparse coefficients includes to iteratively solve an optimization objective function.

5. The malware detection system of claim 1, wherein to classify the testing data includes to compute a distance from files in the testing data to each class in the dictionary of samples, and to determine a closest class.

6. The malware detection system of claim 1, wherein to determine the sparse coefficients includes to scale the testing data.

7. At least one non-transitory machine-readable medium including instructions for preventing evasion attacks on a malware detection system, which when executed by a machine, cause the machine to:
   create a dictionary of samples having classes from training data, wherein the training data includes data labeled as malware or benign;
   receive testing data, wherein the testing data is unlabeled as malware or benign;
   select, from a standard classification system, a sparse classification system, or a semi-supervised classification system, the sparse classification system based on determining that a feature of the testing data has been added, removed, or contaminated;
   determine, based on selecting the sparse classification system, sparse coefficients for the testing data using the dictionary of samples;
   classify the testing data as malware or benign using the sparse coefficients and the classes of respective samples according to a sparse classification; and
   output the sparse classification.

8. The at least one non-transitory machine-readable medium of claim 7, further comprising instructions to:
estimate model parameters for the training data and the testing data using a conditional expectation maximization function;
select a closest fitted model using the estimated model parameters;
determine a likelihood of files of the testing data being malware or benign using the closest fitted model;
classify the files of the testing data based on the likelihood according to a semi-supervised classification; and
output the semi-supervised classification.

9. The at least one non-transitory machine-readable medium of claim 8, wherein to output the sparse classification includes to output an average of the sparse classification and the semi-supervised classification.

10. The at least one non-transitory machine-readable medium of claim 7, wherein to determine the sparse coefficients includes using a greedy pursuit algorithm.

11. The at least one non-transitory machine-readable medium of claim 10, wherein the greedy pursuit algorithm includes an orthogonal matching pursuit algorithm.

12. The at least one non-transitory machine-readable medium of claim 7, wherein to determine the sparse coefficients includes to iteratively solve an optimization objective function.

13. The at least one non-transitory machine-readable medium of claim 7, wherein to classify the testing data includes to compute a distance from files in the testing data to each class in the dictionary of samples, and to determine a closest class.

14. The at least one non-transitory machine-readable medium of claim 7, wherein to determine the sparse coefficients includes to scale the testing data.

15. A malware detection system for preventing evasion attacks, the malware detection system comprising:
one or more processors coupled to a memory device, the memory device containing instructions which, when executed by the one or more processors, cause the one or more processors to:
receive training data and testing data, wherein the training data includes data labeled as malware or benign and wherein the testing data is unlabeled as malware or benign;
select, from a standard classification system, a sparse classification system, or a semi-supervised classification system, the semi-supervised classification system based on determining a number of instances of the testing data is larger than a number of instances of the training data;
estimate, based on selecting the semi-supervised classification system, model parameters for the training data and the testing data using a conditional expectation maximization function;
select a closest fitted model using the estimated model parameters; and
determine a likelihood of at least one file of the testing data being malware or benign using the closest fitted model;
classify the at least one file based on the likelihood according to a semi-supervised classification; and
output the semi-supervised classification.

16. The malware detection system of claim 15, wherein the instructions further cause the one or more processors to:
create a dictionary of samples having classes from the training data;
determine sparse coefficients for the testing data using the dictionary of samples;
classify the testing data as malware or benign using the sparse coefficients and the classes of respective samples according to a sparse classification; and
output the sparse classification.

17. The malware detection system of claim 16, wherein to output the semi-supervised classification includes to output an average of the sparse classification and the semi-supervised classification.

18. The malware detection system of claim 15, wherein to estimate the model parameters includes using Gaussian mixture modeling.

19. The malware detection system of claim 15, wherein to determine the likelihood includes to determine a log-likelihood.

20. The malware detection system of claim 15, wherein to select the closest fitted model includes using Bayesian information criterion.

21. The malware detection system of claim 15, wherein to classify the at least one file based on the likelihood includes using a categorical classification to determine a class where the at least one file has a maximum posterior probability.

22. At least one non-transitory machine-readable medium including instructions for preventing evasion attacks on a malware detection system, which when executed by a machine, cause the machine to:
receive training data and testing data, wherein the training data includes data labeled as malware or benign and wherein the testing data is unlabeled as malware or benign;
select, from a standard classification system, a sparse classification system, or a semi-supervised classification system, the semi-supervised classification system based on determining a number of instances of the testing data is larger than a number of instances of the training data;
estimate, based on selecting the semi-supervised classification system, model parameters for the training data and the testing data using a conditional expectation maximization function;
select a closest fitted model using the estimated model parameters;
determine a likelihood of at least one file of the testing data being malware or benign using the closest fitted model;
classify the at least one file based on the likelihood according to a semi-supervised classification; and
output the semi-supervised classification.

23. The at least one non-transitory machine-readable medium of claim 22, wherein to estimate the model parameters includes using Gaussian mixture modeling.

24. The at least one non-transitory machine-readable medium of claim 22, wherein to classify the at least one file based on the likelihood includes using a categorical classification to determine a class where the at least one file has a maximum posterior probability.

* * * * *